US005297247A

United States Patent [19]

Kan

[11] Patent Number: 5,297,247

[45] Date of Patent: Mar. 22, 1994

[54] DISPLAY DEVICE

[75] Inventor: Susanna K. Kan, Hong Kong, Hong Kong

[73] Assignee: Chinese Computers Limited, Hong Kong, Hong Kong

[21] Appl. No.: 113,315

[22] Filed: Aug. 30, 1993

Related U.S. Application Data

[63] Continuation of Ser. No. 617,388, Nov. 19, 1990, abandoned, which is a continuation of Ser. No. 216,396, Jul. 7, 1988, abandoned.

[30] Foreign Application Priority Data

Jul. 7, 1987 [GB] United Kingdom ................. 8715964
Feb. 15, 1988 [GB] United Kingdom ................. 8803418

[51] Int. Cl.[5] ................................................ G06F 15/20
[52] U.S. Cl. ..................................... 395/151; 395/166
[58] Field of Search ............... 395/150, 151, 164, 165, 395/166; 455/31, 38; 364/242.94, 242.95, 242.96, 919.02, 919, 919.3

[56] References Cited

U.S. PATENT DOCUMENTS

| | | | |
|---|---|---|---|
| 4,286,329 | 8/1981 | Goertzel et al. | 364/900 |
| 4,591,850 | 5/1986 | Lundström | 340/799 |
| 4,594,674 | 10/1986 | Boulia et al. | 395/150 |
| 4,760,606 | 7/1988 | Lesnick et al. | 382/48 |
| 4,768,031 | 8/1988 | Mori et al. | 340/825.44 |
| 4,818,987 | 4/1989 | Ide et al. | 340/825.47 |
| 4,829,434 | 5/1989 | Karmel et al. | 364/424.1 |
| 4,954,979 | 9/1990 | Eibner et al. | 395/151 |

OTHER PUBLICATIONS

Doll, "Data Communications", 1978, pp. 410–417, John Wiley & Sons, N.Y.

*Primary Examiner*—Phu K. Nguyen
*Attorney, Agent, or Firm*—Fitzpatrick, Cella, Harper & Scinto

[57] ABSTRACT

A portable radio pager receives a radio message encoded with graphical information, e.g. Oriental language characters, to be displayed. The radio message is converted into an address code of N-bits. Predetermined and programmable language characters are stored respectively in on-board, read-only and random access memories at addressable locations. More than $2^N$ addressable locations are addressed to obtain the language characters to be displayed on the pager.

23 Claims, 2 Drawing Sheets

DISPLAY DEVICE

Figure 1:
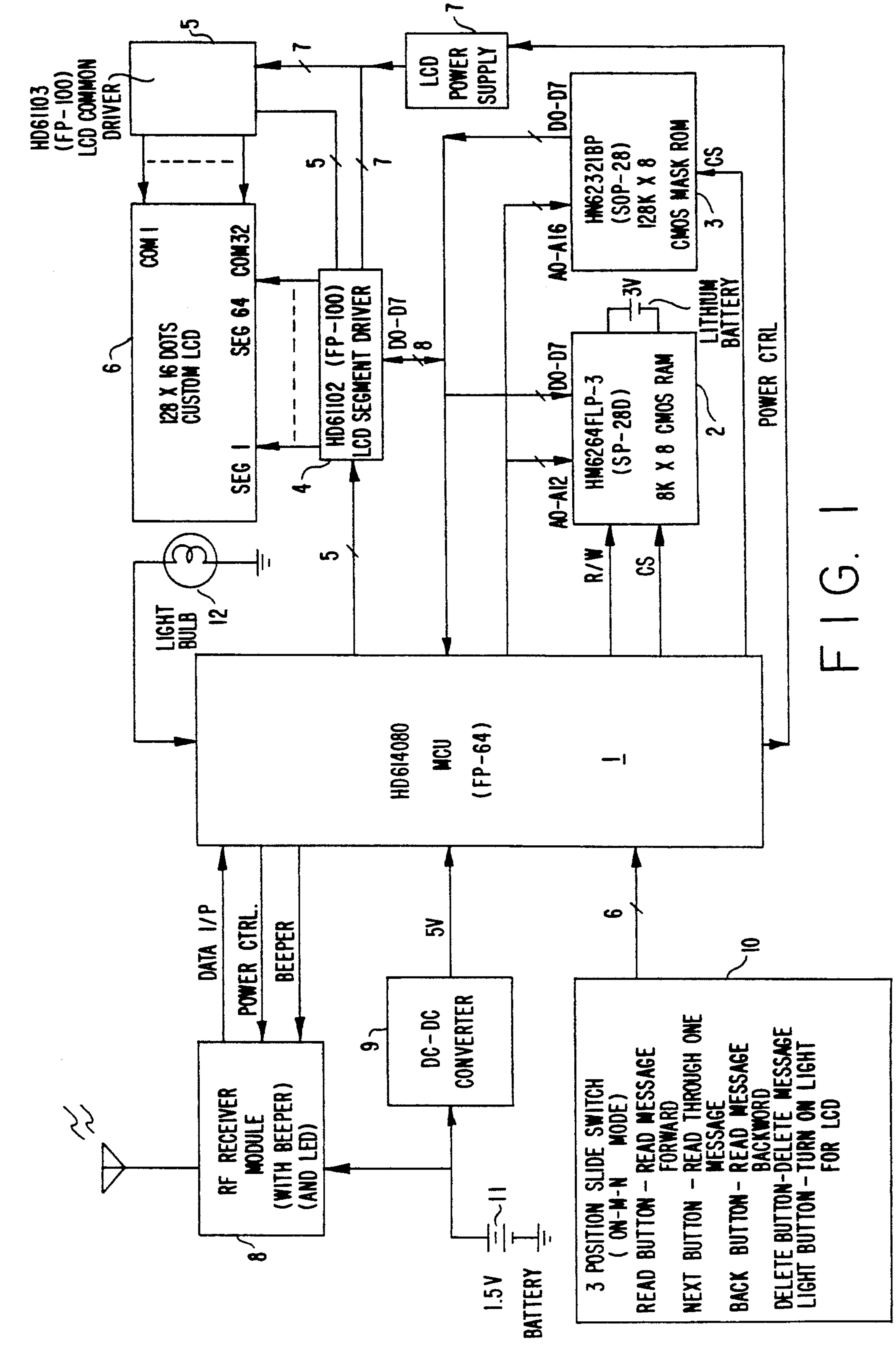

This application is a continuation of application Ser. No. 07/617,388, filed Nov. 19, 1990, now abandoned, which is a continuation of application Ser. No. 07/216,396, filed Jul. 7, 1988, now abandoned.

This pocketable display device for displaying characters or graphic images received by radio. It relates particularly, but not exclusively to non-alphanumeric (English) languages, i.e. general pictographic, written languages including Oriental languages such as the Chinese language and to a radio paging device for use with such languages.

It is known to be extremely difficult to implement a pager receiver for pictographic Oriental languages for the following two reasons:

a) Most Oriental languages have a huge number of characters or pictograms as compared to English style European languages. In particular, the Chinese language is composed of more than 50,000 different characters. Therefore, without the invention of a special storage technique, it would be impossible to accommodate such a large vocabulary in any form of storage device which would enable the pager to have a size comparable with the size of a pack of 20 cigarettes. This is essential for a pocket radio pager receiver.

b) Normally, longer air-time (which is a valuable factor in the paging business) is required to transmit a character of an Oriental language than a usual alphanumeric character due to the large number of characters which require a longer code to identify individual characters. Unless a special message recognition technique can be devised and built into the radio pager receiver, an Oriental language radio pager receiver will be too expensive in terms on running cost for its air-time message transmission.

At present, there are, of course, numerous radio pager receivers which can provide the user with information in English and alphanumeric characters. There still does not exist a radio pager receiver which can receive and display the Oriental languages; in particular for the Chinese language by overcoming the above mentioned problems. The usefulness and attractiveness of information display pagers would be enhanced considerably by the provision of a pager, capable of displaying greater amount of information to the users in different Oriental languages especially in the most popular Chinese language.

A further problem with current pagers is that they have an "Identification Code" (ID) which has been written and fixed permanently into a piece of Read Only Memory, called a code plug to enable the paging company to address individual pager receivers. It would be much more cost effective and convenient to have a pager which uses no code plug but another innovative concept to signify its own identification. At the moment, any change of the pager number (i.e. ID) requires the replacement of the physical code plug, which may involve the pager being taken back to the paging station physically.

According to a first aspect of the invention, there is provided a display device for displaying alphanumeric and/or pictographic characters such as of an Oriental language including Chinese, Korean and Thai and/or graphic information comprising:

radio receiving circuitry for receiving a radio message in which is encoded characters and/or graphic images to be displayed;

at least one display for displaying the received as such characters and/or as a graphic image: and processing circuitry for receiving the radio message as N-bit message data words from the receiving circuitry, the processing circuitry being operative to convert the data words into displayed characters and/or graphic images in a manner such as to extend the total number of displayable characters and/or graphic images beyond $2^N$ (2 raised to the power N) by using at least one of the $2^N$ possible data words to alter the conversion used to generate the characters and/or usage.

A second aspect of the invention provides a display device comprising:

radio receiving circuitry for receiving a radio message;

at least one display for displaying the received radio message as such characters and/or as a graphic image; and processing circuitry for converting data words of the received message into displayed characters and/or graphic images;

means for storing, between the receipt of radio messages by the radio receiving circuitry, the value of at least one parameter used by circuitry of the device for defining a characteristic of its operation;

and means responsive to at least one command encoded in a received message to set at least one such parameter to a required value.

These aspects of the invention are applicable to a display device, particularly a radio paging device independently of one another or in combination with one another.

As will become apparent from the following description, the two aspects of the invention may be used to solve the above mentioned problems, and when used together, may provide a pager which can receive and display any type of Oriental languages, in particular, the Chinese language and which requires no code plug but yet can still be addressed by the paging company individually. By using a custom made "Single Chip Microprocessor Application Specific Integrated Circuit (ASIC)" controller loaded with a special designed software program, the radio pager receiver can have the capability to store the message data collected by an electronics data reception module via a radio frequency channel into a random access memory device-RAM, and at the same time through searching from a character fonts table residing partly in a character generation read only memory-ROM and partly in a read/write memory-RAM by executing an innovative floating storage technique (to be described later) to display the message received on a graphic LCD module and a dynamic identification (to be described later) concept to identify a particular pager receiver among all receivers.

The radio pager receiver itself can store up multiple messages for the user to examine later. The control means of the pager can be arranged to enable the displayed messages to be viewed one by one either in the forward or reverse directions and when it reaches the end, it will display the first message again, the second message and so forth again. It also enables each message, if too long, to be displayed frame by frame (i.e. one display's worth at a time). The user can also select messages to be deleted from the memory. The control means can also enable the user to switch on/off the LCD display background lighting, and switch off the audio tone upon receipt of a message.

The first aspect of the invention enables implementation of the above mentioned floating storage technique (FST) which is an innovative idea by using an optimum number of bits to address a unique entry from a fixed size character fonts table which has the capability to cover an unlimited number of characters or pictograms. This can be explained as follows:

Let it be assumed that "N" bits are used to represent an address code representing one character of, for example, an Oriental language. An N-bit code can normally address a maximum of "2 to the power N" entries, each code corresponding to a respective character. The FST involves different usages of the $2^N$ total number of available codes along the lines of the following. In particular, it may divide the $2^N$ codes into 4 usages:

| | | |
|---|---|---|
| Usage 1 | "X" combinations | to address "X" fixed entries with a character font table residing in read only memory (ROM). |
| Usage 2 | "Y" combinations | to address "Y" fixed entries with the character font table residing in RAM which can be altered via the system controller through receiving a command from the radio frequency channel. |
| Usage 3 | "Z" combinations | to address "phrases" composed of a number of pointers to cascade a sequence of single character entries within the fixed vocabulary from table "X" and "Y". These pointer sequences are located also in RAM which can be altered by the system controller through receipt of a command from the radio frequency channel. |
| Usage 4 | "1" combinations | in case the required character font does not exist in the "X" and " Y" table or the display of some graphic is required, this specific address code can instruct the system to construct the required graphic or character fonts from the direct bit pattern data received from the radio frequency channel; the end of the bit pattern can be indicated in any suitable way, eg, by a bit pattern following it (such as the bit pattern indicating the start of usage 4) or by a preamble which indicates the lengths, width and coordinates of the image being sent. |

It is obvious that the sum of "X", "Y", "Z" and 1 will still equal to $2^N$. However, this technique offers the following unique advantages over other methods being used:

Usage 1 can be used to hold the most frequently used characters/pictograms, in the language in question for efficient and fast processing and translation.

Usage 2 can be used to expand the system's capability to recognise the whole character/pictogram set of that particular language without any pre-set limit.

USage 3 enables the use of just "N" bits to represent a frequently used phrase which might comprise a string of any length of characters or pictograms. This represents a considerable saving of data space and licence transmission time; the transmission time for message transmission is the most expensive and important element in the paging industry.

Usage 4 further expands the system to recognise information more than text messages, but to any form of graphic information. In the paging business, it makes the pager receiver become a small facsimile receiver.

As an example of applying the FST to the Chinese language in particular to the radio pager receiver application, we found from statistics that by appropriately selecting them, the fixed 4,000 characters can cover over 99% of the vocabulary used in the paging industry. Therefore, it is possible to use a unique 12 bits (one and half byte) address to identify a character font entry. In other words,

| Where "N" = 12 bits and | |
|---|---|
| "X" = 4,000 combinations | to address total 4,000 fixed characters font residing in a 128K × 8 bits ROM. |
| "Y" = 32 combinations | to address a total of 32 programmable characters from a font residing in part of the 8K × 8 bits RAM. |
| "Z" = 63 combinations | to address a total of 63 programmable phrases residing in part of the 8K × 8 bits RAM. |
| "1" = 1 combination | to address general graphic information. |

The second aspect of the invention can be used to avoid having to change the ID ROM to alter the pager ID. The paging company simply sends a command through wireless transmission to the pager to achieve the same result. The removal of the code plug will also save some space so the pager can be made smaller. Thus, this aspect of the invention provides a dynamic identification (DI) technique whereby the pager's identification code (ID) is stored in a portion of the message RAM which is non-volatile, e.g. by being backed up by a 10 year life lithium battery, instead of being stored in ROM. Through intelligent control by a custom microcontroller, this identification code is no longer prefixed but can be changed easily under authorisation of the paging company to simply issue a command to the receiver via the radio frequency channel. In addition, more than one identification code for different purposes of application can be stored simultaneously which makes different categories of news broadcasting to a particular group of subscribers easy and cost effective.

The term "radio paging device" as used in the present description and claims is not intended to be limited to a device dedicated solely to that purpose but is intended to include all devices which provide that function in a personally portable form. In particular, apart from its implementation as a dedicated device, the invention may also be put into effect by providing an accessory, attachment or insert to a personally portable electronic device having a suitable display and effective to receive radio paging transmissions and display them on that display.

Figure 2:
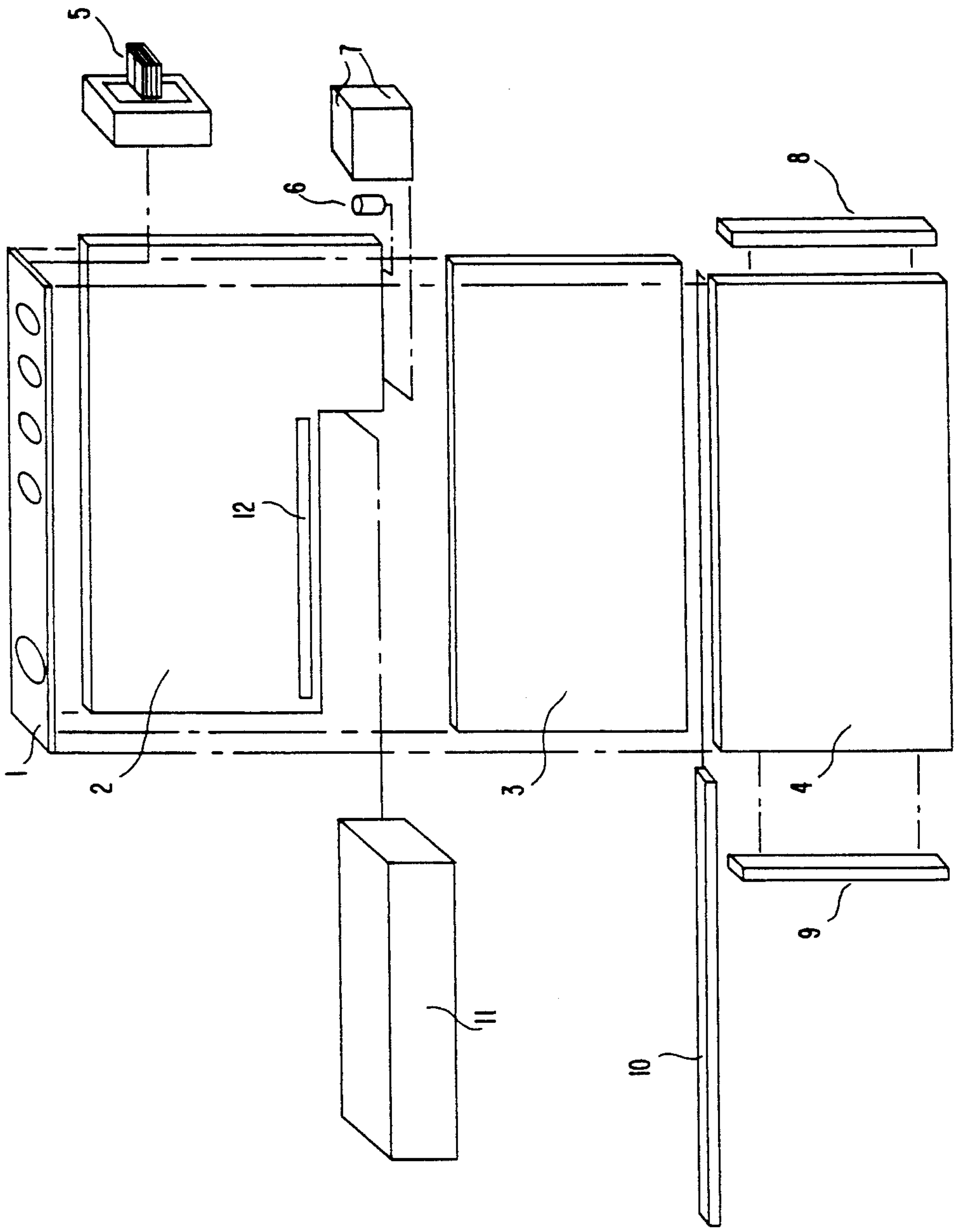

The invention will be further described by way of non-limitative example with reference to the accompanying drawings in which:

FIG. 1 is a block diagram illustrating the circuitry of a pager in accordance with the invention; and FIG. 2 shows how the different sub-modules are assembled together to form a complete radio pager receiver unit.

The pager illustrated in the attached figures comprises a pocketable housing (not shown) preferably of the order of size of 2½"×3"×½" (63.5×76×12.7 mm) which includes a custom one-chip MCU 1 (Microcontroller Unit-HD614080 from Hitachi, Japan) loaded with a specially written computer program to implement each of the above described functions, a character generator custom masked RoM 3 (Read Only Memory, HN62321BP from Hitachi, Japan) a graphic liquid crystal display module capable of showing 16×128 dots graphic or to display one frame of a certain number of characters for a particular language (e.g., for the Chinese language, 8 characters can be shown in 16×16 dots font) which comprises of 2 drivers IC 4 and 5 (LCD segments driver HD61102 and LCD common driver HD61103 from Hitachi, Japan) and a high contrast LCD display 6 custom made by Seiko with which the whole LCD module is powered by a specially designed LCD power supply circuit 7, a lithium-battery-backed message storage read/write RAM 2 (HN6264FLP-3 from Hitachi, Japan) of capacity 8K×8 bits for storing message data, one or more pager identification codes and some programmable Oriental language characters; in particular, the Chinese character fonts and phrases. A key panel 10 comprises one 3 position sliding mode switch to activate the pager and 5 push-buttons for users operations. A radio frequency (RF) receiver module 8 comprises RF tune circuit, amplifier, filters and wave shaping circuits as a hybrid unit for capturing data signal from the air, a beeper and a light-emitting diode (LED) to generate the audio and visual alert signal upon message received, one piece of 1.5 volt AA-size battery 11 to power the RF receiver module 8, a DC-DC converter 9 to step up the voltage from battery 11 to power the remaining system and finally a small light bulb 12 or some other lighting device to provide background lighting to LCD module.

The pager is constructed (refer to FIG. 2) and programmed so that it can receive specially coded message and display characters of the Oriental languages, in particular, the Chinese language under user's control. The following paragraph describes the operation principle of the pager.

The paging company transforms the message in the Oriental language, in particular, the Chinese language or graphic information context using the paging computer system into a binary bit stream based on the floating storage technique coding algorithm, and then associates the message with either a specific pager receiver subscriber or the group broadcasting subscribers plus some redundant bits for self error correction and finally encodes all data bits as a complete message packet according to the Universal POCSAG standard (CCIR radio paging code No. 1) and broadcasts to the air through a particular radio frequency channel.

Assuming the pager has been switched active, the MCU 1 wakes up the RF receiver module 8 from time to time to detect if there is any message which requires its attention by comparing the identification code associated with the message with its own identification stored in the RAM 2 according to the dynamic identification concept. If the result is positive, MCU 1 stores the message into the RAM 2 for later repeated examination, and at the same time, searches the character generator ROM 3 and other programmable characters font or phrases table in RAM 2 to transform the message into the Oriental language or Chinese character or other graphic information and then shows the message on the LCD module. In addition, an alert tone is generated by the beeper unit and the LED is flashed inside the RF module 8 which is controlled again by the MCU 1. The user can switch off the tone by hitting any button on the key panel 10; otherwise, the tone will be turned off automatically after about 8 seconds by the MCU 1.

Battery 11, DC/DC converter 9 and LCD power circuit 7 serve to distribute the power to individual working modules of the paper. If the environment is dark and the LCD cannot be seen clearly, the user can press and hold the "LIGHT" button on the key panel 11 to turn on the light bulb or to the lighting devices 12 to have display illumination.

The beep tones can be substituted by a vibration alert unit if the user does not wish the tone to disturb other people.

The pager may provide both manual and auto time shut-off features to conserve power consumption. Battery low alert/indication is also provided.

The program of the MCU 1 can interpret information which has been encoded into a bit stream according to the Oriental language; in particular the Chinese character, coding system specially designed for the present invention based on the set forth floating storage technique and transmitted in standard POCSAG format in 512 baud speed or a higher baud speed switchable by the paging company. It can also support standard POCSAG alphanumeric display.

During data reception, the paper may provide 2 bits self error correction and 3 bits error detection capability for identification code matching while 1 bit self error correction and 2 bits error detection capability for message recovery to ensure maximum receiving reliability.

With RAM 2, the said pager can store up to 32 separate messages, the maximum length of each message depending on how the floating storage technique is being used, with no practical restriction. Standard alphanumeric messages transmitted in POCSAG format can also be recognised. The screen formats of the LCD module are different between the Oriental language; in particular the Chinese characters, and alphanumeric-characters display mode. In the former, each frame can display a number of Oriental language characters; in particular, 8 Chinese characters in 16×16 dot fonts; in the latter, each frame can display 2 lines×21 characters in 5×7 dot font. In addition, the pager can support both small and capital letter alphabets. The next paragraph will describe the detailed user operation of the paper.

The pager is suitably programmed so as to operate in one of the following 4 states:

a) Active state.

The MCU 1 receives and executes commands from the user via the key panel 10, allocating some spare time periodically to check if any message is coming from the RF receiver. Power is supplied to all components in this state.

b) Sleep state

System will go to sleep state from Active State when NO key on the keyboard has been pressed for approximately 30 seconds or the user has stepped through all the stored messages. In this state, the LCD module will be switched off.

c) Disable stage

The pager will enter this state if a DISABLE command has been received. This state is similar to the Sleep State except that further users' commands will not be effective until an ENABLE command is received through broadcast.

d) Off State

User switches the pager to this state by sliding the mode switch to the OFF position. All components except the external RAM chip 2 will be cut off. The pager cannot receive any further message until turned back on.

In the following, NORMAL operation refers to operating the pager under Active or Sleep state.

The key panel 10 will be provided with the following keys, switches and buttons, the MCU 1 being suitably programmed to produce operation as described.

| | | |
|---|---|---|
| 1 | Mode switch: | A 3 position slide switch with its position to define the different users operation modes:<br>ON: The pager is under Active or Sleep stage while an alert tone will be heard and LED will be flashed whenever a call has been received.<br>M: Same as ON made except the alert tone will be disabled.<br>OFF: Pager is OFF. All memorised messages will be erased. |
| 2 | Next button: | Enable user to examine individual message in frame by frame basis if the message is too long to be fitted within one frame. |
| 3 | READ button: | Enable user to read next message in FORWARD direction. Latest message will be placed at the top position of the RAM buffer. |
| 4 | BACK button: | Enable user to read next message in BACKWARD direction. |
| 5 | DELETE button: | Enable user to delete the current examined message from the RAM buffer. To delete all messages, user can press both the READ and BACK button. |
| 6 | Light button: | Display illumination will be effective if this button has been pressed and held down. |

The provision of the above functions, both insofar as they are implemented by programming of the microprocessor and by the illustrated circuitry is a matter of routine for the skilled man.

What is claim is:

1. In a system for transmitting messages from a common source to a plurality of movable destinations by radio transmission, a device at at least one of the destinations, comprising:

(a) receiver means for receiving a radio message from the common source, said message comprising a sequence of coded signals;

(b) fixed memory means for storing fixed graphical images, which include character font images, at addressable locations;

(c) read-write memory means for storing graphical images that can be changed, which include character font images, at addressable locations;

(d) processor means, coupled to said receiver means, for processing the coded signals received from said receiver means, said processor means including:

(1) means for converting each coded signal into an address code having N bits of $2^N$ possible address codes;

(2) first means for addressing said fixed memory means with a first set of the $2^N$ possible address codes to retrieve fixed graphical images therefrom;

(3) second means for addressing said read-write memory means with a second set of the $2^N$ possible address codes to retrieve the graphical images therefrom;

(4) means responsive to a command signal from the common source for altering the graphical images stored in said read-write memory means, whereby the total number of graphical images retrievable from said fixed memory means and said read-write memory means by the $2^N$ possible address codes exceeds $2^N$; and (e) display means coupled to said processing means for displaying the graphical images retrieved from said fixed memory means and said read-write memory means by said first and second addressing means.

2. A device according to claim 1, wherein said fixed graphical images stored in said fixed memory means comprise a predetermined character table.

3. A device according to claim 2, wherein said predetermined character table has about 4000 graphical images, which include character font images, stored therein, and wherein N equals 12.

4. A device according to claim 3, wherein said variable character table has addresses for at least 32 graphical images, which include character font images, and wherein N equals 12.

5. A device according to claim 2, wherein said changeable graphical images stored in said read-write memory means comprise a variable character table.

6. A device according to claim 5, wherein said changeable graphic images stored in said read-write memory means comprises a pointer table storing pointers for cascading a sequence of character entries from within said predetermined character table and said variable character table to produce phrases of graphical images, which include character font images.

7. A device according to claim 6, wherein said pointer table has addresses for at least 63 pointers and wherein N equals 12.

8. A device according to claim 5, said device being radio pager, and (1) wherein said radio message received by said receiver means contains encoded identifying indicia, and (2) wherein said processor means includes means for comparing the encoded identifying indicia with the identifying data stored in said read-write memory means to determine whether a received radio message is intended for said radio pager.

9. A device according to claim 1, wherein said fixed memory means includes a read-only memory in which predetermined graphical images are stored at a first predetermined number of addressable locations, said first predetermined number being less than $2^N$, and wherein said addressing means is operative for addressing the predetermined graphical images in said read-only memory utilizing said first predetermined number of addressable locations.

10. A device according to claim 9, wherein said read-write memory includes a random access memory in which programmable graphical images are stored at a second predetermined number of addressable locations, said second predetermined number being less than $2^N$, each programmable graphical image consisting of an individual data element, and wherein said addressing means is operative for addressing the programmable graphical images in said random access memory utilizing said second predetermined number of addressable locations.

11. A device according to claim 10, wherein the programmable graphical images constitute programmable phrases stored in said random access memory at a third predetermined number of addressable locations, each phrase consisting of multiple data elements, said third predetermined number being less than $2^N$, and wherein said addressing means is operative for addressing the programmable phrases in the random access memory utilizing said third predetermined number of addressable locations.

12. A device according to claim 10, wherein the programmable graphical images constitute general graphic information stored in the random access memory at a fourth predetermined number of addressable locations, said fourth predetermined number being less than $2^N$, and wherein said addressing means is operative for addressing the general graphic information in said random access memory utilizing said fourth predetermined number of addressable locations.

13. A device according to claim 12, wherein the sum of said first, second, third and fourth predetermined numbers equals $2^N$.

14. A device according to claim 13, wherein N equals 12; and wherein said first, second, third and fourth predetermined numbers are 4000, 32, 63 and 1, respectively.

15. A device according to claim 1, said device being a radio pager having a non-volatile memory in which a unique identification code is stored, wherein the radio message received by said receiver means contains encoded identifying indicia, and wherein said processor means includes means for comparing the encoded identifying indicia to the stored identification code to determine whether a received radio message is intended for said radio pager.

16. A device according to claim 1, further comprising control means connected to said display means for controlling the manner in which the graphical images are displayed.

17. A device according to claim 16, wherein said control means includes a first actuator for controlling, when actuated, the forward sequence in which the graphical images are to be viewed.

18. A device according to claim 17, wherein said control means includes a second actuator for controlling, when actuated, the amount of graphical images to be displayed upon each viewing.

19. A device according to claim 18, wherein said control means includes a third actuator for controlling, when actuated, the backward sequence in which the graphical images are to be viewed.

20. A device according to claim 19, wherein said control means includes a fourth actuator for controlling, when actuated, the deletion of graphical images.

21. A device according to claim 1, wherein the graphical images stored in said fixed memory means and in said read-write memory means correspond to language characters selected from the group consisting of the Oriental languages including the Chinese, Korean, and Thai languages.

22. A device according to claim 1, further wherein said processing means comprises means for generating graphical images responsive to graphical image information signals from said common source and said display means comprises means for displaying said graphical images generated responsive to said graphical information signals.

23. In a system for transmitting messages from a common source to a plurality of movable destinations by radio transmission, a device at at least one of the destinations, comprising:

(a) receiver means for receiving radio messages from the common source containing at least one of (1) graphical information, which includes character font information, to be displayed, and (2) command data, which includes an identifying code;

(b) display means for displaying graphical images, which include character font images, corresponding to graphical information received by said receiver means from the common source;

(c) non-volatile memory means for changeably storing the identifying code identifying said device, in accordance with said command data received by said receiver means; and (d) processor means coupled to said receiver means, for processing radio messages received from said receiver means when the received identifying code matches the stored identifying code, said processor means including:

(1) means for converting encoded graphical information into graphical images for display by said display means, and (2) means responsive to command data received by said receiver means from the common source for altering the identifying code identifying said device and stored in said non-volatile memory means.

* * * * *

UNITED STATES PATENT AND TRADEMARK OFFICE
CERTIFICATE OF CORRECTION

PATENT NO. : 5,297,247
DATED : March 22, 1994
INVENTOR(S) : SUSANNA K. KAN

It is certified that error appears in the above-identified patent and that said Letters Patent is hereby corrected as shown below:

ON TITLE PAGE

In [56] References Cited, under OTHER PUBLICATIONS:
"Communications"," should read --Communication",--.

IN THE DRAWINGS

Sheet 1 of 2, "BACKWORD" should read --BACKWARD--.

COLUMN 4

Line 4, "USage 3" should read --Usage 3--.

COLUMN 5

Line 19, "Japan) a" should read --Japan), a--.
Line 24, "of" should be deleted.

COLUMN 6

Line 19, "paper." should read --pager.--.
Line 59, "paper." should read --pager.--.
Line 62, "state." should read --state--.

COLUMN 7

Line 6, "stage" should read --state--.
Line 54, "claim" should read --claimed--.

UNITED STATES PATENT AND TRADEMARK OFFICE

CERTIFICATE OF CORRECTION

PATENT NO. : 5,297,247

DATED : March 22, 1994

INVENTOR(S) : SUSANNA K. KAN

It is certified that error appears in the above-identified patent and that said Letters Patent is hereby corrected as shown below:

COLUMN 8

Line 53, "radio pager," should read --a radio pager,--.

COLUMN 9

Line 22, "claim 10," should read --claim 11,--.

Signed and Sealed this

Twentieth Day of December, 1994

Attest:

BRUCE LEHMAN

Attesting Officer

Commissioner of Patents and Trademarks